Sept. 12, 1939.   R. E. HOLMES   2,173,016
OPHTHALMIC MOUNTING
Filed July 6, 1938
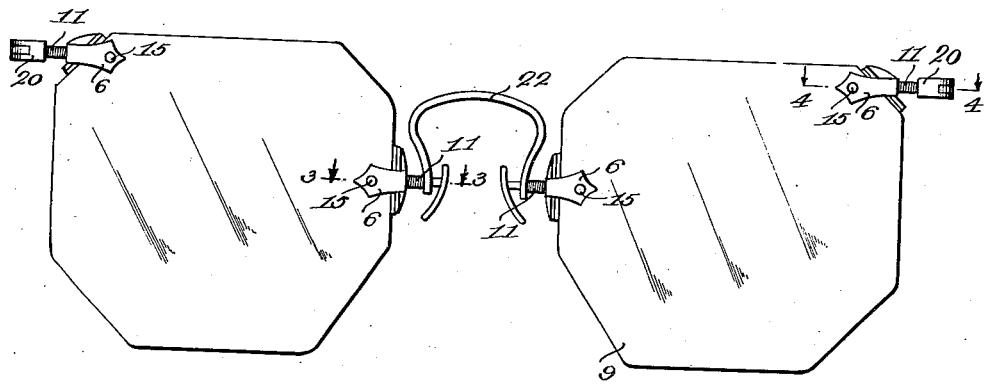
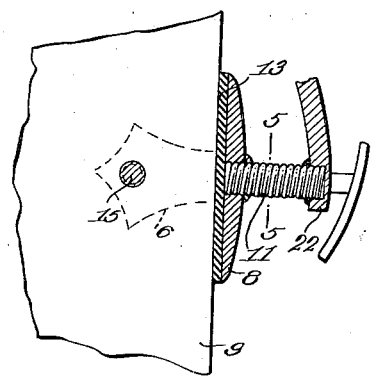
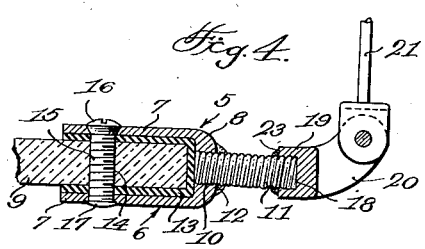
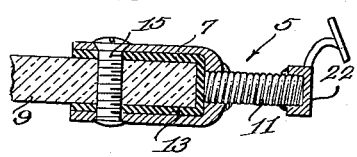
Richard E. Holmes
INVENTOR Patented Sept. 12, 1939

2,173,016

UNITED STATES PATENT OFFICE 2,173,016

OPHTHALMIC MOUNTING

Richard E. Holmes, Scranton, Pa.

Application July 6, 1938, Serial No. 217,738

5 Claims. (Cl. 88—47)

My invention relates to certain new and useful improvements in eye-glasses and more particularly to the frame mountings therefor.

One of the principal objects of my invention is to provide a frame mounting for eye-glasses or the like equipped with flexible means effecting a connection between the lenses and frame to permit relative movement and thereby prevent breakage of the lenses.

Another object of my invention is to provide a device of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a front elevation of a pair of spectacles equipped with my invention.

Figure 2 is a vertical sectional view through one of the mountings.

Figures 3 and 4 are detail sectional views taken on the lines 3—3 and 4—4 of Figure 1.

Figure 5 is a detail sectional view taken on the line 5—5 of Figure 2.

My flexible mounting 5 comprises a yoke 6, preferably constructed of metal for instance gold. Said yoke is fashioned with a pair of spaced arms 7 integrally connected together at one end thereof by a transverse section 8. Said arms 7 embrace the inner and outer faces of a lens 9. The section 8 has extending therethrough an opening 10 in which is fixed one end of a coil spring 11, said end being soldered to the section 8 as at 12. Interposed between the yoke 6 and lens 9 is a substantially U-shaped resilient member 13 constituting a cushion and preferably constructed of rubber. The lens 9 has formed therethrough an opening 14 registering with the alined openings formed in the arms 7 and member 13. One of said openings in said arms is threaded for engagement with a screw 15 extending through said arms, cushion and lens. Said screw is headed as at 16 on one end thereof. The screw 15 is preferably constructed of a semi-flexible material, for instance rubber, and is normally compressed within the openings whereby the unheaded end protrudes beyond one of the arms and in normal extended condition to form a head 17 as clearly illustrated in Figures 3 and 4. The opposite end of the spring 11 is seated within an opening 18 formed in a frame member 19 which, in one instance, constitutes part of a hinge 20 connected to the temple bar 21 and, in the other instance, constitutes a section of a nose bridge 22 as clearly illustrated in the drawing.

The spring is soldered to the member 19 as at 23. Said spring is provided throughout the length thereof with a core member 24 of a semi-resilient material, for instance rubber whereby to lend a degree of rigidity thereto.

From the foregoing it will be apparent that the nose bridge is connected to the lenses 9 by a pair of my mountings 5 and that each of the temple bars 21 are likewise connected to the lenses by a mounting 5 and thereby serves to permit a degree of relative movement between the frame, constituting the nose bridge and temple bars, and the lenses to preclude breakage of the lenses upon inadvertent movement of the frame and also to absorb shock transmitted to the lenses through the frame caused by dropping or twisting of the spectacles.

It is to be understood that while I have shown a screw 15 for securing the lens 9 to the yoke 6, a rubber plug may be substituted therefor.

What I claim is:

1. In a lens mounting, the combination of a lens having a bore extending therethrough, a yoke about said lens and formed with apertures registering with said bore, and an elastic member extending through said apertures and said bore and securing said lens and yoke in connected relation, said member of a normal diameter greater than the diameters of said apertures whereby to effect compression of that portion of said member extending through said apertures, said member having at least one decompressed end extending beyond said yoke and provided with a marginal edge section normally overlying said yoke and compressible for insertion and withdrawal through said yoke.

2. In a lens mounting, the combination of a lens having a bore extending therethrough, a yoke about said lens and formed with apertures registering with said bore, and an elastic member extending through said apertures and said bore and securing said lens and yoke in connected relation, said member of a decompressed diameter greater than the diameters of said apertures and said bore whereby to effect compression of that portion of said member extending through said apertures and said bore, said member provided with an end section of a larger diameter than the diameters of said apertures and extending beyond said yoke and provided with a marginal edge engaging said yoke, said member having an oppositely disposed end section of a sufficient length to provide a head thereon when said last mentioned end section is extended beyond said yoke and decompressed after insertion.

3. The elements of claim 2 as set forth and defined therein including, said end sections coacting to maintain said yoke in clamped engagement with said lens, said member of a sufficient yieldability to afford a flexible connection between said yoke and lens and thereby preclude transmission of torque therebetween.

4. In a lens mounting, the combination of a lens having a bore extending therethrough, a yoke about said lens and formed with apertures registering with said bore, and an elastic member provided with a head and a threaded shank extending through said apertures and said bore and securing said lens and yoke in connected relation, said shank of a uniform decompressed diameter materially greater than the diameters of said apertures and said bore whereby to effect compression of said shank upon feeding of the latter through said apertures and said bore, said shank having an end section oppositely disposed from said head and of a sufficient length to provide a head thereon when said end section is extended beyond said yoke and decompressed after being fed therethrough.

5. The elements of claim 4 as set forth and defined therein including, said heads coacting to maintain said yoke in clamped engagement with said lens, said member of a sufficient yieldability to afford a flexible connection between said yoke and lens to preclude transmission of torque therebetween.

RICHARD E. HOLMES.